Figure 1:
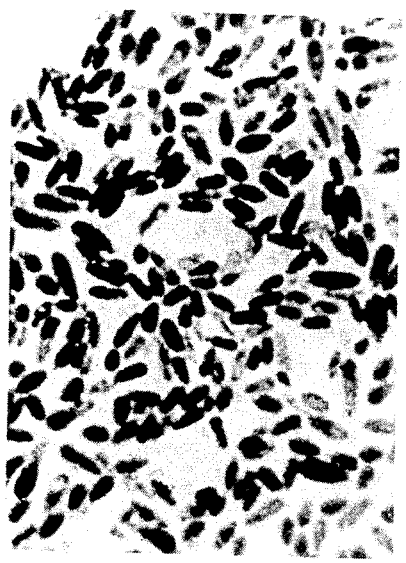
Figure 1:
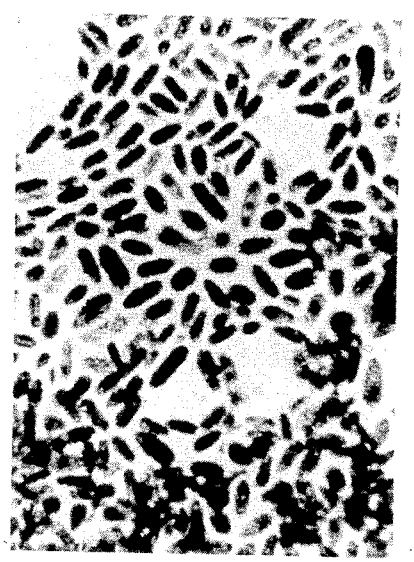
Figure 1:
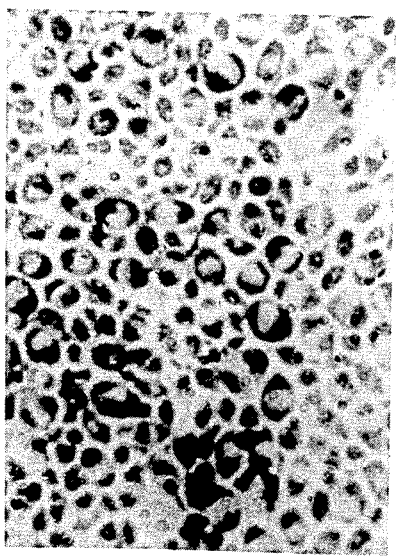
Figure 1:
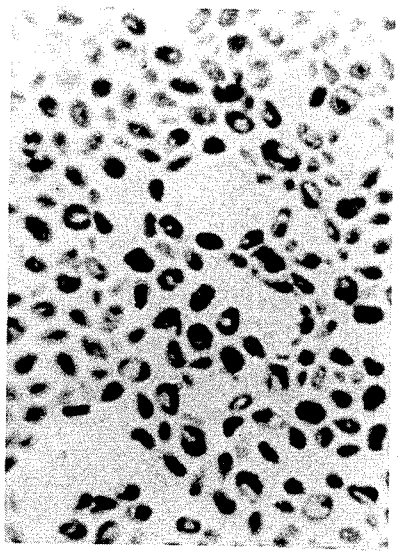

United States Patent [19]

Nagasawa et al.

[11] 3,855,063

[45] Dec. 17, 1974

[54] PROCESS FOR PRODUCING A MICROBIAL PROTEINOUS SUBSTANCE

[75] Inventors: Taro Nagasawa, Tokyo; Joji Ono, Chiba; Tutomu Kudo, Kawasaki; Yoshitugu Harada, Tokyo, all of Japan

[73] Assignee: Morinaga Milk Industry Co., Ltd.

[22] Filed: May 12, 1971

[21] Appl. No.: 142,530

[30] Foreign Application Priority Data

July 3, 1970 Japan.................................. 45-57783
Nov. 20, 1970 Japan.............................. 45-102408

[52] U.S. Cl. ................................. 195/28 R, 195/79
[51] Int. Cl.............................................. C12b 1/00
[58] Field of Search ......... 195/28 R, 29, 78, 79, 97, 195/112, 82, 104

[56] References Cited
UNITED STATES PATENTS
3,411,989   11/1968   Nakao et al. ......................... 195/28
3,669,846   6/1972   Thuillier .............................. 195/96

Primary Examiner—Lionel M. Shapiro
Assistant Examiner—R. B. Penland
Attorney, Agent, or Firm—Otto John Munz

[57] ABSTRACT

A microbial proteinous substance useful in manufacturing various foodstuffs, animal feed and fish culturing feed can be prepared from a hydrocarbon-assimilating yeast of genus Candida by mutating it to mutants by chemical mutagenic agents or physical mutagenic means, inoculating a suspension containing said mutants on a solid culture medium and incubating to form colonies, selecting mutant strains totally or partially deprived of cell wall integrity from cells of said colonies by means of Gram stain and microscopic inspection, proliferating said mutant strains in a culture medium, and utilizing the proliferated cell mass as raw material.

17 Claims, 6 Drawing Figures

Control I

Control III

M-7002

M-7005

(B)

(C)

PROCESS FOR PRODUCING A MICROBIAL PROTEINOUS SUBSTANCE

The present invention relates to a novel and useful mutant of hydrocarbon-assimilating yeast of genus Candida, a method of obtaining such mutant, a cell obtained by incubating such mutant and an intracellular substance extracted from such cell as well as foods and nutritive medicaments made by utilizing such cells or intracellular substances and manufacturing method thereof.

More particularly, the present invention relates to a Gram-negative mutant obtained by treating a hydrocarbon-assimilating yeast of genus candida using a chemical reagent or a physical means which is high in digestibility, can easily isolate its cell constituents therefrom, substantially deficient in mannan and is deprived of its cell wall integrity, and a Gram-positive mutant which is lower in mannan content than its parent strain and is partially deprived of its cell wall integrity; a method for obtaining such mutant; a cell obtained by inoculating and incubating such mutant on a YM medium or a culture medium containing sulfite pulp waste liquor, hydrocarbon or waste molasses as a main carbon source and, after proliferating, separating the cell, and an intracellular substance obtained by treating such cell chemically or physically such as alkaline treatment or exposure to sonic oscillation; and a method of obtaining such cell or intracellular substance; as well as a method for manufacturing foods, feeds or nutritive medicaments by utilizing these cells or intracellular substances.

Heretofore, the yeast cell has been utilized as food, feed and medicament because of being high in protein and nucleic acid content and containing a large quantity of nutrient such as vitamin. Taming of characteristic yeast strain, in order for adaptation to medium employed, has been tried for a long time. However, such taming has been carried out only in a viewpoint of the ecomization of the production process of yeast cell such as an efficiency of assimilation of carbon source in culture medium, a yield of cell mass, a rate of proliferation, etc., but, as things are, the isolation and induction of strain and mutant which are high in nutritive value in a viewpoint of digestibility for food and feed are not at all carried out. The fact that the yeast cell has a very rigid cell wall around the cytoplasm and the characteristic of this cell wall is due to a complicated higher structure substantially composed of polysaccharides such as mannan, glucan, etc., (D. H. Northcote, Biochemical Journal 51, 232, 1952, and P. A. Roelfsen, Biochimica et Biophysica Acta, 10, 477, 1953) is evident from the experimental results that, if the yeast cell is treated with a polysaccharide hydrolysing enzyme produced by, for example, a snail or some microorganisms, the structure of cell wall is disintegrated and is transformed to the protoplast structure in which the cytoplasm or cell membrane is exposed (S. Sugawara, Nature, 212, 92, 1966; G. S. Kobayashi et al., Journal of Bacteriology, 88, 795, 1964; R. E. Domanski, Journal of Bacteriology, 96, 270, 1968; and J. Monreal, Journal of Bacteriology, 94, 241, 1967).

However, yeast cell is little valuable as food and feed since it is very low in digestibility when it is administered to human and animals per se in the intact state (Journal of Japanese Society of Food and Nutrition 23, 62, 1970), because a polysaccharide-hydrolyzing enzyme having such property is not found in the digestive fluid of higher animals. This is the main reason for that the application of yeast cells to food or feed industry is retarded.

Much effort has been performed on removal of yeast cell wall, which enable to elevate the digestibility or extractability of intracellular substance in yeast cell. Articles or patent application has been presented on employment of chemical agents, biological means and mechanical disrupture by means of alkali or enzyme treatment, autolysis, plasmolysis, sonic oscillation, homogenization and so on. However, these treatment and means are too complicated in operation and to be expensive in equipment to be applied in industry.

Therefore, it is desirable in a viewpoint of yeast utilization to induce and isolate a yeast mutant which is deprived of its cell wall integrity totally or partially, and is high in digestibility or isolation efficiency of cellular proteinous substances.

An object of the present invention is to obtain a yeast mutant which is higher in cell digestibility when ingested by human or animals and the intracellular substance thereof is easier in isolation of its intracellular substance and is higher in industrial utility than the conventional yeast cell.

Another object of the present invention is to provide a cell obtained by industrially proliferating the yeast mutant, which is high in digestibility and suitable as a raw material for foods and feeds for human and animal use.

Further another object of the present invention is to isolate an intracellular substance suitable as a raw material for food, feed and nutritive medicaments very efficiently and economically under a mild condition for industrial processing of such cell.

As the result of research for obtaining a mutant which is high in digestibility, easily capable of isolating its intracellular substance and is deprived of its cell wall integrity, from various yeast strains of Family Cryptococcaceae including strains which is capable of assimilating inexpensive carbon source from such a point of view, the present inventors have found that mutants having the desired characteristic can be induced and isolated.

The mutants of the present invention can be obtained by the following procedure:

A hydrocarbon-assimilating yeast of genus Candida is treated with a chemical mutagenic agent or by a physical mutagenic means to induce mutants; a cell suspension containing the mutants is incubated on a suitable solid medium to form isolated colonies; colonies having a rough surface layer are selected; cells in the colonies are first inspected by an optical microscope to select cells of circular form; and the circular cells are Gram-stained to select a Gram-negative cell. Gram-negative cells are then subjected to chemical determination of mannan content to isolate the mutant cell in which the mannan content is around nil. This is the mutant cell which is deprived of its cell wall integrity and does not contain mannan. On the other hand, cells in the isolated colonies are Gram-stained to select a Gram-positive cell which is low in electron density of outer layer of cell wall by electron microscopic inspection. Mannan content of the cells thus selected are determined and a cell in which mannan content is less than 70, % that of parent strain is selected. This is the cell which is partially deprived of its cell wall integrity.

The reason for selecting the mutant of circular form and further isolating a Gram-negative strain is based on the consideration of the present inventors that a yeast cell which is deprived of its cell wall integrity forms a sphere so as to minimize its surface area because it cannot tolerate against the outer pressure otherwise, and on the finding that the site of fixation of primary staining by crystal violet at the time of Gram staining is cell wall, that is, discharge of crystal violet fixed on cell wall structure is remarkably delayed when stained cells are rinsed with an organic solvent after staining. (Bacteriological Review, 16; 1, 1952, Stain Technology, 40; 79, 1965 and "The Microbial World;" Second Edition, p. 169, Prentice-Hall Inc., Englewood Cliffs, N. J. U.S.A.) And also a mutant which is modified in structure of cell wall and is partially deprived of its cell wall integrity, even though it is Gram-positive, can be easily detected by inspection by means of an election microscope. The cell which is low in electron density of outer layer of cell wall by the electron microscopic inspection is such a cell that the cell wall structure is modified, the mannan content which is a main ingredient of cell wall is lowered and the cell wall integrity is partially deprived of.

The principle of the present invention consists in obtaining such a mutant strain that its intracellular substances can be effectively utilized and easily extracted by applying the above described method to a hydrocarbonassimilating yeast of genus Candida to obtain a mutant which is totally or partially deprived of its cell wall integrity, in proliferating such mutant, and in utilizing an useful intracellular ingredient in such cell.

Figure 2:
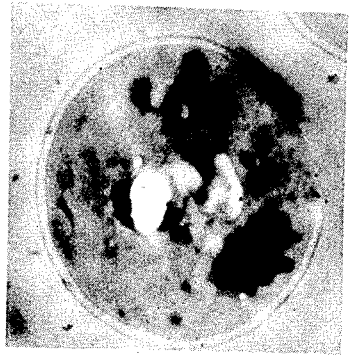
Figure 2:
Figure 2:
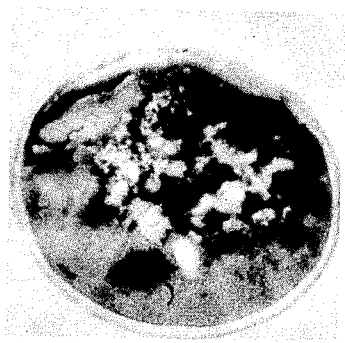
Figure 3:
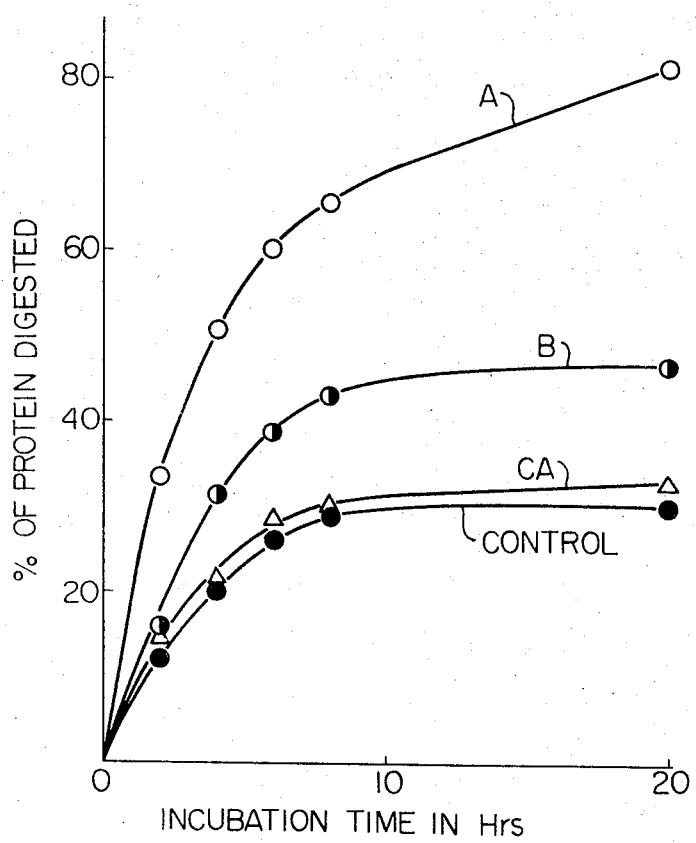
Figure 4:
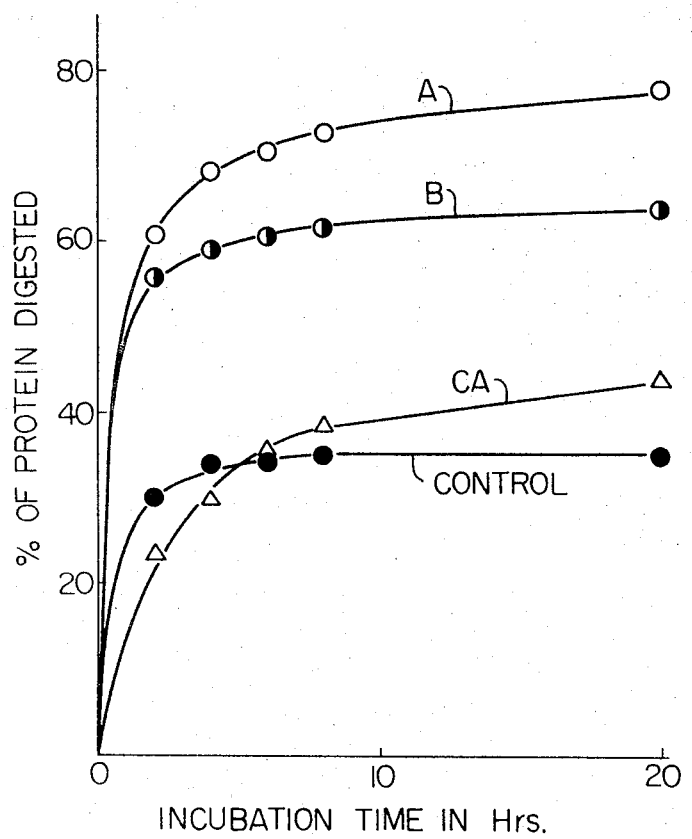

FIG. 1 shows micrographs of Gram stained cells of M-7002, M-7005, M-7 and Candida albicans A.T.C.C. 10259; FIG. 2 shows electron micrographs of cells M-7002, M-7007 and M-7; FIG. 3 shows digestion rate of cellular protein of Groups A and B, Control and CA strains by bovine gastric pepsine as a function of digestion period; and FIG. 4 shows digestion rate of cellular protein of Groups A and B, Control and CA strains by proteolytic enzyme prepared from pancreas of yellow fish as a function of digestion period.

The present invention is first to expose the cells of hydrocarbon-assimilating yeast of genus Candida to chemical mutagenic agents or physical mutagenic means. As a chemical mutagenic agents, N-methyl-N'-nitro-N-nitrosoguanidine, nitrous acid, acriflavin, 4-nitroquinoline-N-oxide, and ethylmethanesulfonate may be used. And as a physical mutagenic means, irradiation by ultraviolet light, irradiation by X-ray, and irradiation by ionizing radiations may be used.

The method of inducing and isolating a mutant in the present invention may be exemplified as follows;

1. Obtaining of mutant by N-methyl-N'-nitro-N-nitrosoguanidine

According to Lodders' text (J. Lodder and N. J. W. Kreger-Van Rij: "The Yeast" Second Edition, p. 370, NOrth-Holland Publishing Company, Amsterdam, 1967), yeast strains of genus Candida was isolated from soil of Japan, and cells of M-7 strain, one strain of Candida species thus isolated, was inoculated and incubated in YM-medium of pH 6 (0.3% of malt extract, 0.3% of yeast extract, 0.5% peptone, and 1% of glucose in composition) to exponential growth phase, and cells were harvested and resuspended in YM-medium to a cell density of $10^7$/ml. After exposing the cell suspension to N-methyl-N'-nitro-N-nitrosoguanidine (K & K laboratories Inc., California, U.S.A.) to a concentration of 40 $\mu$/ml. at 30°C for 6 hours, it was diluted with a sterilized saline by 100 times. The diluted suspenison was incubated to form isolated colonies on the YM-agar plate prepared by adding 2% of agar to the above described YM-medium. Colonies exhibiting a rough surface were selected and then cells in these colonies were taken out and inspected by means of an optical microscope to isolate about 200 strains having a circular form of cell. Each strain was subjected to Gram strain, and three Gram-negative strains were isolated and named as Candida periphelosum M-7002, M-7003 and M-7004, respectively.

The remaining strains were, after treating the cells with glutaraldehyde, fixed with osmium tetraoxide according to the conventional method, or were stained and fixed wth perimental Cell Research, 20, 28, 1960), and then were inspected by means of an electron microscope according to Moore's procedure (Journal of Biochemical Cytology 3, 225, 1957).

Ten strains in which the cell wall, particularly its outer layer is low in electron density, that is, the intensity of blackening on photographic print is low, were separated and further each strain was proliferated in the above mentioned YM medium at 37°C for 48 hours and cells were harvested, and, after lyophilysing, the quantities of mannan and glucan in them were determined according to W. E. Trevelyan's method (Biochemical Journal, 63, 23, 1956).

A mutant, the mannan content of which is reduced to below 2 g per 100 g of dried cell, was detected and 2 strains complying with this criteria were isolated and named as Candida periphelosum M-7007 and M-7008, respectively. 2. Obtaining of mutant by irradiation of ultraviolet light Cells of Candida lipolytica NRRL-Y-6795 in exponential phase of growth were harvested and suspended in a sterilized saline to a cell density of $10^7$ per 1 ml.

One ml. of this suspension was placed in a petri dish of 9 cm in diameter and, after irradiating at a distance of 30 cm from 15 Watt germicidal lamp manufactured by Toshiba Co., Ltd. for 3 minutes, was diluted with a sterilized saline by 100 times.

The diluted suspension was incubated on the above mentioned YM-agar plate to form isolated colonies. In the same method as described in (1), colonies exhibiting a rough surface were selected and further about 200 strains having a circular form of cell and exhibiting an authentic Gram-negative were isolated therefrom. Each strain was subjected to chemical determination of mannan content according to the procedure by Trevelyan described above. One strain, of which mannan content is substantially nil, was isolated from these strain and named as Candida lipolytica M-7005. This procedure for selection of mannan deficient strain, by chemical determination, is required in the case of the mutant isolation from Candida lipolytica for security because this parent strain originally exhibits an intermediary performance of positive and negative in Gram stain causing obscurity in recognizing Gram-negative mutants. This procedure can be omitted in the case of mutant isolation from other species of Candida since they are authentic Gram-positive organism.

And further from the remaining strains a mutant which is decreased in mannan content to less than 70% of the parent strain, was detected through the procedures as described in (1).

One mutant was isolated complying wth above criteria and was named as Candida lipolytica M-7009.

(3) Obtaining of mutant by nitrous acid

Cells of Candida guilliermondii IFO-1062 which were proliferated in the above described YM medium to log phase of growth were collected and suspended in 0.1 m acetate buffer of pH 4.5 containing 0.05 m sodium nitrite to a cell density of $10^7$ per 1 ml.

After allowed to stand at 30°C for 40 minutes, cells were collected by centrifugation and, after washing, were suspended in and diluted with a sterilized solution containing 1% of peptone and 5% of NaCl, by weight per volume, by 100 times.

The diluted suspension was incubated on the YM-agar plate to form colonies. Next, through the same procedure as described in (1), about 300 strains having circular form of cell were separated from colonies of rough surface and one strain of Gram-negative mutant was isolated therefrom and named as Candida guilliermondii M-7006.

4. Obtaining of mutant by acriflavin

Cells of Candida guilliermondii IFO-162 was suspended in YM-medium to a cell density 1062 $10^3$ per 1 ml, and acriflavin was added to a concentration of 4 $\mu$/ml thereto and incubated at 30°C for 10 hours. Cells were collected and, after washing with a sterilized saline, were diluted with 100 folds volume of the saline.

The diluted suspension was subjected to colony formation on YM-agar plate. One of mutant strain which is lower is mannan content than the parent strain was detected through the same method as described in (1) and named Candida guilliermondii M-7010.

Nine strains of yeast mutant of genus Candida obtained by the above methods possess an ability of assimilating normal paraffine, and, among these, M-7002, M-7003, M-7004, M-7005 and M-7006 (hereinafter referred to Group A) are rough in colony surface, circular in cell form and Gram-negative while M-7007, M-7008, and M-7010 (hereinafter referred to Group B) are smooth in colony surface similarly as in the wild strain and Gram-positive. M-7009 revealed a similar property in colony surface as M-7007, M-7008 and M-7010, however, it possessed an intermediary performance of Gram-positive and Gram-negative.

The microbiological properties of these yeast mutant of genus Candida are as shown in Table 1. Among these strains M-7002, M-7005, M-7007 and M-7010 are tabulated hereinbelow along with their corresponding A.T.C.C. registration numbers, which were secured by depositing samples with the American Type Culture Collection in Washington, D.C. on Feb. 24, 1971.

| Microorganism name | | A.T.C.C. number |
|---|---|---|
| Candida periphelosum | M—7002 | 20314 |
| Candida lipolytica | M—7005 | 20315 |
| Candida guilliermondii | M—7006 | 20316 |
| Candida periphelosum | M—7007 | 20317 |
| Candida guilliermondii | M—7010 | 20318 |

M-7002 as a typical example of Group A obtained as above, M-7007 as a typical example of Group B and Candida albicans A.T.C.C. 10259 as a typical example of conventional wild strain were incubated on the above described YM-agar plate at 30°C for 3 days to obtain isolated colonies.

It was found that the colony surface of M-7002 was rough while those of M-7007 and Candida albicans were smooth.

Table 1

Microbiological properies of mutants

| | | Group A (M-7002~M-7006) | Group B (M-7007~M-7010) |
|---|---|---|---|
| Assimilation of organic carbon compounds | glucose | + | + |
| | galactose | + | + |
| | lactose | − | − |
| | maltose | + | + |
| | sucrose | + | + |
| | ethanol | + | + |
| | n-paraffine | + | + |
| Utilization of nitrogen compounds | peptone | + | + |
| | urea | ± | ± |
| | NH$_4$Cl | + | + |
| | KNO$_3$ | − | − |
| Vitamine requirement | Biotin | + | + |
| | Inosine | − | − |
| | Nicotic acid | − | − |
| | Pantothenic acid | − | − |
| | Pyridoxin | − | − |
| | Thiamine | − | − |
| | p-Aminobenzoic acid | − | − |
| Gram stain | | negative | positive* |
| Cell form | | sphere | rod |
| Cell dimension | | 5 — 6 $\mu$ | 3 $\mu$ |
| Colony surface | | rough | smooth |
| Range of growth temp. | | 0 — 37°C | 0 — 37°C |
| Protein content | | 59% | 59% |

*: M-7009 is exceptional in exhibiting Gram ±

Other strains of Group A, other strains of Group B and the other conventional wild strains comprising Candida and Candida guilliermondii and Candida utilis, etc. were similar as M-7002, M-7007 and *Candida albicans*, respectively, in feature of their colony surface.

The mutants of group A among these mutants of genus Candida, exhibit a remarkable difference from the conventional wild strains such as M-7 (Control (1)) *Candida guilliermondii* I.F.O. 1062, an authentic example of hydrocarbon-assimilating yeast (Control (II)) and *Candida albicans* A.T.C.C. 10259 (Control (III)) in that the mutants are Gram-negative and contain no mannan.

While mutants of group B are lower in mannan content than the conventional wild strains in spite of being similarly positive in Gram stain as the control strains. M-7009 is exceptional in exhibiting an intermediary performance of positive and negative in Gram stain.

Evidences for above conclusion are presented in the following. The above described 12 strains and *Candida lipotica* NRRL-6795 and *Candida tropicalis* IAM-4147 (these 2 strains are hereinafter abbreviated to CA strains), 14 strains in total, were incubated by shaking in culture medium of pH 6.8 comprising a composition of 1 % of normal paraffine having 14 to 18 carbon atoms, 0.5 % of $NH_4Cl$, 0.7 % of $KH_2PO_4$, 0.02 % of $FeSO_4 \cdot 7H_2O$, 0.001 % of $MnSO_4 \cdot 7H_2O$ 0.01 % of $CaCl_2 \cdot 2H_2O$ and 0.05 % of yeast extract at 30°C for 48 hours.

Cells were collected by centrifugation and a portion thereof was Gram stained and inspected by a microscope. The micrographs (magnification: 2,000), of mutants M-7002 and M-7005 as typical examples and Control (I) and Control (iii) after Gram staining are shown in FIG. 1. Violet-colored cells show that crystal violet was fixed on cell wall after primary staining and are recognized to be Gram-positive while green colored cells are such cells that crystal violet was not fixed but eluted out by organic solvent treatment and reacted with secondary staining by methyl green and are recognized to be Gram-negative. From FIG. 1, it is clear that M-7002 and M-7005 are Gram-negative while Control (I) and Control (III) are Gram-positive. The performance of M-7003, M-7004, M-7005 against Gram staining was quite identical with that of M-7002 and they were concluded to be Gram-negative. M-7007, M-7008, and M-7010 were, on the contrary, responded against the staining in the same mode as the conventional wild strain convincing that these are Gram-positive. M-7009 was concluded to be intermediary of Gram-positive and Gram-negative. Next, cells of 9 mutants, 3 control strains and 2 CA strains were collected and, after washing, lyophilized, and then their mannan and glucan contents (%) were determinded according to the above described Trevelyan method.

And based the relative content of mannan in mutants were calculated baseed on 100 % of the mannan content in control strain. The results are shown in Table 2. From Table 2 it was proved that mutants M-7002, M-7003, M-7004, M-7005, and M-7006, that is Group A strains, are remarkably distinguished from the control strains in two respects that they are Gram-negative and mannan content in them is substantially nil while M-7007, M-7008, and M-7010, that is Group B strains, are Gram-positive like as the control strains but their mannan contents are decreased to 71.4–10.7 % of that of the control. *Candida lipolytica* and M-7009 were only exception in exhibiting an intermediary response against Gram stain, and the mannan content in the latter was remained within the range of Group B.

According to the experiments carried out by the present inventors, the mannan contents of other three conventional strains that is *Candida parapsilosis*, *Candida intermedia* and *Candida robusta*, proliferated under the above incubation conditions were high value of 3.0 ± 0.2 %.

Table 2

| | Gram stain | Polysaccharides Content (g/100g dried cells) | | Relative content of mannan |
|---|---|---|---|---|
| | | glucan | mannan | |
| Control (I) | + | 7.2 | 2.8 | |
| Control (II) | + | 7.0 | 2.8 | (100) |
| Control (III) | − | 6.7 | 3.0 | |
| M-7002 | − | 6.2 | 0 | 0 |
| M-7003 | − | 6.6 | 0 | 0 |
| M-7004 | − | 6.6 | 0 | 0 |
| M-7005 | − | 6.3 | 0 | 0 |
| M-7006 | − | 6.4 | 0 | 0 |
| M-7007 | + | 6.2 | 0.3 | 10.7 |
| M-7008 | + | 6.6 | 1.1 | 39.3 |
| M-7009 | + | 6.6 | 2.0 | 71.4 |
| M-7010 | + | 6.4 | 1.8 | 64.3 |
| Candida lipolytica NRRL-6795 | ± | 9.1 | 2.1 | 75.2 |
| Candida tropicalis IAM-4147 | ± | 9.3 | 2.3 | 82.2 |

And also, in Table 2, the relative content of mannan in two CA strains shown in the bottom column were inspite of being the conventional wild strains, 75.0 and 82.2 %, respectively, of the control strains which are low values equivalent to that of some mutants in the present invention. The experimental results showing that these CA strains are lower in mannan content than other conventional wild strains was presented by Nabeshima et al. (Journal of Technology 48, 556, 1970). However, according to the observation by menas of an electron microscope, these CA strains are high in electron density of cell wall and kept remained their cell wall integrity. Therefore, a favorable effect observed in the mutants of the present invention as described below can not be obtained in CA strains.

Next, cells of M-7002, M-7007, and M-7 strains as representatives of the mutants of the above described Groups A, B and the control strain, respectively, were observed by means of an electron micrograph (magnification 20,000) according to the method described in (1). The results are as shown in FIG. 2.

The control and M-7007 strains are observed to possess a distinct cell wall in peripheral area of cells, while the thickness of cell wall portion is thin and the electron density is low in M-7002 strain. That is, it is clear that M-7002 strain is deprived of its cell wall integrity and that it is about twice the control strain in cell width. And also, according to the observation by an electron microscope, it is clear that M-7003, M-7004, M-7005, and M-7006 are similarly deprived of their cell wall integrity. As already described, from facts that the site of primary staining by crystal violet is a cell wall and M-7002, M-7003, M-7004, M-7005, and M-7006 are Gram-negative, that the main component of cell wall is mannan and the mutants of the present invention do not contain mannan or are lower in mannan content than the native strain, and that M-7002, M-7003, M-7004, M-7005, and M-7006 reveal defective cell wall structure by electron microscope observation, it was confirmed that M-7002, M-7003, M-7004, M-7005, and M-7006, that is, Group A mutants are deprived of cell wall integrity while M-7007, M-7008, M-7009, and M-7010, that is Group B mutants are partially deprived of cell wall integrity. From the fact that cell wall lowers the digestibility and the utilization efficiency of intracellular substances of yeast cell, the above described mutants of the present invention are remarkably excellent in both digestibility and utilization of intracellular protein in comparison with the conventional strain. Next, experiments were conducted in order to provide the evidences to show the favorable effect of mutants of the present invention in digestibility and protein extractability out of cells. The results are as follows:

In the first experiment, cellular proteins of 9 strains of the above described mutants of genus Candida, 3 strains of the control and 2 CA strains were tested on their digestibilities by bovine gastric pepsin and proteolytic enzyme prepared from pancreas of a yellowtail fish. These 14 yeast strains were respectively incubated by shaking in the normal-paraffine medium above described, at 30°C for 48 hours and proliferated cells were harvested by centrifugation. Then after washed and dried, each cell mass was suspended in hydrochloric acid of pH 1.8 to 1 % cell density. Bovine gastric pepsin (2 x crystallized and lyophilized, 153-1370-1, manufactured by Sigma Chemical Company) was added to each suspension to 0.5 % by weight per volume, and the digestion was allowed at 37°C. Portions of reaction mixture were pipetted at the reaction periods indicated in FIG. 3. The centrifugation was carried out, and the nitrogen content in supernatant fluid was determined in accordance with Kjeldahl method. The digestion rate of protein, expressed in percent of the above nitrogen content to the total nitrogen content in the cell mass before digestion, was similarly determined. The results are shown in FIG. 3.

In FIG. 3, the ordinate designates the digestibility of intracellular protein of yeast by bovine gastric pepsin in percent and the abscissa designates the digestion time in hours. Lines A, B, C, and CA show average digestibilities of Group A mutants, Group B mutants, control strains, and CA strains respectively. As shown in FIG. 3, Group A mutants are higher about 2.7 times the conventional wild strain in average digestibility when comparing in 24 hours after digestion commences and the average digestibility of Group B mutants is about 1.6 times that of the conventional wild strain. In addition, the digestibility in the mutants of the present invention increases even at 20 hours after the digesion started while that in the conventional strain reaches to plateau in 10 hours after the digestion started. Therefore, the yeast mutants isolated by the present inventors was proved to be very easily digested. Next, the digestion rate of cells of the mutants was tested by proteolytic enzyme of fish origin in order to confirm the digestibility of them in case of using them as feed for fish cultivation. The cells were suspended in 0.1M-borate buffer (pH 8.0) to 1 % cell density and proteolytic enzyme, prepared from pancreas of a yellow-tail fish according to Laskowski method ("Methods of Enzymology", Vol. II, page 8, 1st Ed.; edited by S. P. Colowick and N. O. Kaplan, Academic Press Inc., New York, 1955), and 0.005M CaCl₂ were added to the suspension to a concentration of 0.5 % by weight per volume. The digestion was allowed at 37°C, and the digestibility was determined in the same method as employed in digestibility determination by bovine gastric pepsin. The results are shown in FIG. 4. In FIG. 4, the ordinate indicates the digestibility of cellular protein of yeast by proteolytic enzyme prepared from pancreas of a yellow-tail fish, and the abscissa indicates the digestion time. The digestibilities of Group A mutants, Group B mutants, control strains and CA strains are presented by curves A, B, C, and CA, respectively. Group A and Group B mutants were respectively 2.2 and 1.8 times higher the control strains in digestibility when digested with enzyme of pancreas of a yellow-tail fish. Therefore the mutants of the present invention, particularly Group A mutants, were remarkably improved in digestibility in comparison with the control strains. And, even with any of these enzyme systems, CA strains were comparable to the control strains in digestibility. As shown in Table 2, although CA strains are slightly lower in mannan content than the control strains, CA strains are remarkably inferior to the mutants of the present invention in digestibility of cellular protein. CA strains are not subjected to a treatment for mutation induction according to the method of the present invention and are high in electron density in peripheral area of cells when observed by an electron microscope, and therefore, are considered to be not deprived of their cell wall integrities. Accordingly, differing from the control strains and CA strains, the cellular protein of mutants of the present invention are in such a state as being easily digested, because the mutants of the present invention are not only deficient in mannan or decreased in mannan content but also their cytoplasm or cell membrane is directly exposed to the medium since the cell wall integrity is totally or partially deprived.

Next, the efficiency of extracting the intra-cellular substances from these mutants, control strains and CA strains by chemical reagents or physical means was determined for the purpose of design of devices for extracting and isolating intra cellular substances.

Table 3

Protein extraction out of cells

| Yeast strains | % of protein extracted by alkali solution | by sonic oscillation |
|---|---|---|
| M-7002 | 49.5 | 79.3 |
| M-7003 | 51.2 | 72.5 |
| M-7004 | 50.0 | 69.9 |
| M-7005 | 49.5 | 73.2 |
| M-7006 | 49.9 | 75.2 |
| M-7007 | 49.5 | 69.3 |
| M-7008 | 35.2 | 60.0 |
| M-7009 | 28.6 | 45.5 |
| M-7010 | 34.0 | 52.5 |
| Control (I) | 23.6 | 22.6 |
| Control (II) | 25.2 | 27.2 |
| Control (III) | 24.8 | 25.4 |
| Candida lipolytica NRRL-6795 | 25.6 | 29.3 |
| Candida tropicalis IAM-4147 | 23.5 | 25.9 |

Through the same procedure as in the case of experiments shown in FIGS. 3 and 4, nine strains of the above described mutants, 3 control strains and 2 CA strains were proliferated in normal paraffine medium. Cells were collected and suspended in 0.05N—NaOH solution in 1 % of cell density and heated at 50°C for 2 hours and, after centrifugating, nitrogen content in supernatant fraction was determined according to Kjeldahl method, and the extraction rate (%) was calculated from the ratio of the amount of nitrogen extracted in NaOH solution to the total amount of nitrogen in the cell before treatment. The result is shown in column 2 of Table 3. Cells of the above described three groups were respectively suspended in a sterilized saline to 5 % of cell density and 5 ml portions of the suspensions were disrupted by means of a 10KC sonic disintegrator for 5 minutes, thereafter centrifugated, and nitrogen contentent in super-natant fraction was determined. The extraction rate (%) was calculated in the same manner and the result is shown in column 3 of Table 3.

As shown in Table 3, it is clear that the mutants obtained in the present invention are remarkably higher in protein extraction rate by alkaline solution treatment and sonic oscillation in comparison with control strains and, similarly as in the digestibility test by enzyme, the protein extraction rate is elevated as a function of decrease in the mannan content. In spite of lower mannan content in CA strains, rate of protein extraction from them was remained to the similar level as that from the conventional strains. As described in the experimental results shown in FIGS. 3 and 4, it is also clear that the mutants obtained according to the method of the present invention not only possess an unique property to be deprived of mannan or to be lower in mannan content in comparison with the control strains but also to be characterized by genetically defected cell wall structure, resulted in remarkable improvement in protein extraction rate by alkaline treatment or sonic oscillation in comparison with control strains and CA strains. In addition, the mutants of the present invention are superior to the conventional wild strains in extraction efficiency of intracellular substances in cases of urea treatment, autolysis, mechanical grinding, and freeze and thaw treatments. From a fact that M-7002, M-7003, M-7004, M-7005, and M-7006 strains among yeast mutants of genus Candida isolated in the present invention are Gram-negative while all conventional yeast strains are Gram-positive regardless of their growth condition and growth phase, an information that the Gram staining is a method for discriminating a cell wall, an observation by an electron microscope and an experimental result that the digestibility by enzyme and the rate of protein extraction are high, these yeast mutants of genus Candida in the present invention, being different from the conventional strains, has such a characteristics that the cell wall integrity is deprived and the cytoplasm or cell membrane is exposed. It is also clear that four mutants, M-7007, M-7008, and M-7010 are Gram-positive similarly as the conventional strain of yeast incubated under the same condition and M-7009 is intermediary of Gram-positive and Gram-negative, but their mannan contents are decreased to 70 to 10 % of that of the control strains of genus Candida. From a fact that the effect such as rate of enzymatic digestion or extraction of protein, is in an intermediate degree of the above described mutants deprived of cell wall integrity and the control strain, these four mutants are presumed to be partially deprived of their cell wall integrity. Among the conventional strains of yeast of genus Candida, *Candida lipolytica* and *Candida tropicalis* (CA strains) are slightly lower in mannan content than the control strains and *Candida lipolytica* possesses an intermediary property of Gram-positive and Gram-negative. However these CA strains are remarkably lower in rate of protein digested and in extraction rate than the mutants of the present invention, and, therefore, these CA strains quite differ from the mutants of the present invention.

The yeast mutants of genus Candida of the present invention isolated as described above are such a mutant as deprived of cell wall integrity and having a feature of being Gram-negative and not containing mannan, or as being Gram-positive but partially having lost mannan, and are, being different from the usual conventional wild strains of yeast, high in digestibility by a digestive enzyme and are very easy in extraction of intracellular protein by various treatments. Therefore, in case of using yeast cells for human food and feed for domestic animals or fishes, the yeast mutants of genus Candida of the present invention provide highly digestive product, and it is also possible to manufacture a nutritive medicament having a very high nutritive value. Whereas, in case of industrially isolating and separating intracellular substances of yeast, the cost of equipment and expenses for processing can be reduced when the yeast mutants of the present invention are employed, and also the decomposition and denaturation of product can be prevented since the isolation and separation of intracellular substances and autolysis can be carried out under mild conditions. Also, in a viewpoint of extraction and utilization of a biologically active substance such as enzyme, the method of the present invention can be employed with remarkable advantage in comparison with the usual procedure.

EXAMPLE 1

Twenty liters of culture medium (pH 5.5) comprising a composition of 1 % of normal paraffine having 14 to 18 carbon atoms, 0.5 % of $NH_4Cl$, 0.7 % of $KH_2PO_4$, 0.001 % of $FeSO_4 \cdot 7H_2O$, 0.02 % of $MgSO_4 \cdot 7H_2O$, 0.001 % of $MnSO_4 \cdot 7H_2O$, 0.01 % of $CaCl_2 \cdot 2H_2O$ and 0.05 % of yeast extract, by weight, were sterilized. And then the mutant M-7002 was inoculated thereto and incubated during aeration at 30°C for 24 hours. Thereafter, this culture medium was added to 500 l of the sterilized culture medium above described, and further incubated during aeration at 30°C for 48 hours while adjusting pH and then cells were collected by centrifugation dryer to obtain 2.5 kg of dried yeast cell having high digestibility. Two kg of the dried cell mass were taken out therefrom and 12 kg of wheat flour were added thereto. After kneading, the mixture was blended with 6 kg of white fish meal to obtain feed for fishes.

EXAMPLE 2

Twenty liters of culture medium (pH 6.0) comprising a composition of 5 % (as carbohydrate concentration) of molasses for fermentation, 0.25 % of $(NH_4)_2SO_4$, 0.5 % of $KH_2PO_4$, 0.02 % of $MgSO_4 \cdot 7H_2O$, and 0.04 % of yeast extract, by weight, were, after boiling, filtrated and sterilized. The mutant M-7005 was inoculated thereto and pre-incubated at 30°C for 24 hours. This was added to 500 l of the above described sterilized culture medium and incubated during aeration at 30°C for 36 hours and then at 40°C for 12 hours. The cells were collected by centrifugation and, after washing with water, were dried in a drum dryer to obtain 3 kg of dried yeast cell. Two kg portion was taken out therefrom, and 20 kg of 0.1N NaOH were added thereto and, after allowed to stand at 50°C for 2 hours, were centrifugated. The supernatant fraction was adjusted pH to 4.8 by adding HCl to precipitate protein. The protein was separated by centrifugation and dried by a small spray dryer to acquire 500 g of dried cellular protein. Fifty kg of water and 1 kg of glucose were added to 500 g of the protein. Lactobacillus acidophilus was inoculated thereto and fermentation was allowed for 30 hours at 37°C for lactic acid formation. Sugar and flavor were appropriately added thereto obtain a palatable and nutritive high-protein beverage.

EXAMPLE 3

The mutant M-7006 was inoculated to 20 l of culture medium (pH 6.0) comprising a composition of, by weight, 4 % (as carbohydrate concentration) of desulfited sulfite-pulp liquor, 0.2 % of $(NH_4)_2SO_4$, 0.1 % of $KH_2PO_4$, 0.25 % of $MgSO_4.7H_2O$ and 0.3 % of yeast extract. After incubated at 30°C for 48 hours, the fluid was added to 500 l of the above described sterilized culture medium and incubated during aeration at 30°C for 48 hours. Cells were harvested by centrifugation and, after washing with water, were dried in a drum dryer to obtain 2.5 kg of dried yeast cell, which were then powdered by means of a grinder to obtain a nutritive medicament which is high in protein and vitamin content and high in digestibility.

EXAMPLE 4

Twenty liters of culture medium (pH 6.0) comprising a composition of, by weight, 1 % of normal paraffine having 14 to 18 carbon atoms, 0.5 % of $NH_4Cl$, 0.7 % of $KH_2PO_4$, 0.001 % of $FeSO_4.7H_2O$, 0.02 % of $MgSO_4.7H_2O$, 0.001 % of $MnSO_4.7H_2O$, 0.01 % of $CaCl_2.2H_2O$, and 0.05 % of yeast extract were sterilized. The mutant M-7010 was inoculated thereto and incubated during aeration at 30°C for 24 hours. Thereafter, this was added to 500 l of the above described sterilized culture medium and then was further incubated during aeration at 30°C for 48 hours while adjusting pH. Then cells were collected by centrifugation and, after washing with water, dried at 50°C to obtain 2.8 kg of dried yeast cell high in digestibility. One kg was taken therefrom and was mixed with 3 kg of corn grits, 4.8 kg of rice-bran, 1 kg of soy meal, 50 g of salt, and 50 g of calcium carbonate to obtain a formula feed for beef cattle.

EXAMPLE 5

Twenty liters of culture medium (pH 6.0) comprising a composition of, by weight, 5 % (as carbohydrate concentration) of molasses for fermentation, 0.25 % of $(NH_4)_2SO_4$, 0.5 % of $KH_2PO_4$, 0.02 % of $MgSO_4.7H_2O$, and 0.04 % of yeast extract were, after boiling, filtered and sterilized. The mutant M-7007 was inoculated thereto and incubated during aeration at 30°C for 24 hours. This was added to 500 l of the above described sterilized culture medium and incubated during aeration at 30°C for 36 hours and then at 40°C incubated during aeration at 30°C for 36 hours and then at 40°C for 12 hours. Cells were collected by centrifugation and, after washing with water, dried in a drum dryer to obtain 3 kg of dried yeast cell. Two kg were taken out therefrom, added with 20 kg of 0.1N NaOH and, after allowed to stand at 50°C for 2 hours, centrifugated. The supernatant was adjusted pH to 4.8 by adding 1N HCl to precipitate protein which was then separated by centrifugation and dried by means of a small spray dryer to obtain 500 g of dried yeast intracellular protein. Fifty kg of water and 1 kg of glucose were added to 500 g of the protein. The fluid was subjected to lactic acid fermentation by incubating with Lactobacillus acidophilus at 37°C for 30 hours and added with sugar and flavor to obtain a palatable and nutritive protein-rich beverage.

EXAMPLE 6

One kg of yeast cell obtained in Example 3 was mixed with 5 kg of wheat flour, 40 g of salt, 20 g of honey and 2 kg of water and further added with 3.5 kg of gluten, 300 g of edible oil and flavour. The mixture was then baked in an oven at a120°C for 30 minutes to obtain a crisp snack food for diet which possesses a balanced amino acid composition.

EXAMPLE 7

Four kg of dried yeast cell prepared according to the same method as in Example 1 were added to 20 kg of 0.5N NaOH and, after allowed to stand at 50°C for 2 hours, centrifuged to separate the supernatant containing intracellular substances. Two kg of $CaCl_2.2H_2O$ and 0.2 kg of $Ca(OH)_2$ were suspended in 15 kg of water at 90°C, and then the above supernatent was added thereto while stirring. After allowed to stand for 30 minutes, precipitate was separated by centrifugation, washed with and then was suspended in water, and adjusted pH to approximately 7 by adding 6N HCl. The precipitate was centrifuged to obtain a flake-like and meat-like textured foodstuff.

We claim:
1. A process for producing a microbial proteinous substance, comprising the steps of:
 1. mutating a hydrocarbon-assimilating yeast of genus Candida to mutants by chemical mutagenic agents or physical mutagenic means,
 2. inoculating a suspension containing said mutants on a solid culture medium and incubating to form colonies,
 3. selecting mutant strains totally deprived of cell wall integrity and lacking mannan from cells of said colonies by
    selecting colonies the surface of which is rough;
    selecting cells of circular form from said colonies by an optical microscopic inspection;
    staining said cells by Gram stain;
    in which mannan contant is lower than 70% that in the parent strains incubated under the same conditions from said colonies,
 4. proliferating said mutant strains in a culture medium, and
 5. harvesting the proliferated cell mass for protein ingredients in food, feed or medicament.

2. A process for producing an easily digestible or extractable microbial proteinous substance, comprising the steps of
 1. mutating a hydrocarbon-assimilating yeast of genus Candida to a mutant by chemical mutagenic agents or physical mutagenic means,
 2. inoculating a suspension containing said mutants on a solid culture medium and incubating to form colonies,
 3. selecting colonies of which surface is rough,
 4. selecting cells of circular form from said colonies by an optical microscopic inspection,
 5. staining said cells by Gram stain,
 6. selecting Gram-negative cells, totally deprived of cell wall integrity and substantially lacking mannan, 7. incubating said Gram-negative mutant strains in a culture medium for proliferation, and
8. harvesting the proliferated cell mass.

3. A process for producing a microbial proteinous substance, comprising the steps of
1. mutating a hydrocarbon-assimilating yeast of genus Candida to mutants by chemical mutagenic agents or physical mutagenic means,
2. inoculating a suspension containing said mutants on a solid culture medium and incubating to form isolated colonies,
3. selecting colonies of which surface is rough,
4. selecting cells of circular form from said colonies by an optical microscopic inspection,
5. staining said cells by Gram stain,
6. selecting Gram-negative cells, totally deprived by cell wall integrity and substantially lacking mannan,
7. incubating said Gram-negative mutant strains in a culture medium for proliferation,
8. harvesting the proliferated cell mass, and
9. extracting an intracellular substance from said cell mass.

4. A process for producing an easily digestible or extractable microbial proteinous substance, comprising the steps of
1. mutating a hydrocarbon-assimilating yeast of genus Candida to mutants by chemical mutagenic agents or physical mutagenic means,
2. inoculating a suspension containing said mutants on a solid culture medium and incubating to form colonies,
3. staining cells of said colonies by Gram stain,
4. selecting cells which are Gram-positive and lower in the electron density of the outer region of cell wall when observed by electron microscopy, and in which mannan content is lower than 70 % that in the parent strains incubated under the same conditions from said colonies,
5. incubating said Gram-positive mutant strains in a culture medium for proliferation, and
6. harvesting the proliferated cell mass.

5. A process for producing a microbial proteinous substance, comprising the steps of
1. mutating a hydrocarbon-assimilating yeast of genus Candida to mutants by chemical mutagenic agents or physical mutagenic means,
2. inoculating a suspension containing said mutants on a solid culture medium and incubating to form colonies,
3. staining cells of said colonies by Gram stain,
4. selecting cells which are Gram-positive and lower in the electron density of the outer region of cell wall when observed by electron microscopy, and in which mannan content is lower than 70 % that in the parent strains incubated under the same conditions from said colonies,
5. incubating said Gram-positive mutant strains in a culture medium for proliferation,
6. harvesting the proliferated cell mass, and
7. extracting an intracellular substance from said cell mass.

6. The process as set forth in claim 2, wherein said mutant is A.T.C.C. No. 20,314, *Candida periphelosum* M-7002, which is obtained by using N-methyl-N'-nitro-N-nitrosoguanidine as a chemical mutagenic agent.

7. The process as set forth in claim 2, wherein said mutant is A.T.C.C. No. 20.315, *Candida lipolytica* M-7005, which is obtained by irradiation of ultra violet light as a physical mutagenic means.

8. The process as set forth in claim 2, wherein said mutant is A.T.C.C. No. 20,316, *Candida guilliermondii* M-7006, which is obtained by using nitrous acid as a chemical mutagenic agent.

9. The process as set forth in claim 4, wherein said mutant is A.T.C.C. No. 20,217, *Candida periphelosum* M-7007, which is obtained by using N-methyl-N'-nitro-N-nitrosoguanidine as a chemical mutagenic agent.

10. The process as set forth in claim 4, wherein said mutant is A.T.C.C. No. 20,318, *Candida guilliermondii* M-7010, which is obtained by using acriflavin as a chemical mutagenic agent.

11. The process as set forth in claim 1, the step 3 including the step of selecting Gram-negative cells.

12. The process as set forth in claim 1, the step 3 including the step of:
selecting mutant strains partially deprived of cell wall integrity by staining cells of said colonies by Gram stain and selecting cells which are Gram-positive and lower in the electron density of the outer region of cell wall when observed by electron microscopy.

13. The process as set forth in claim 3, wherein said mutant is A.T.C.C. No. 20,314, *Candida periphelosum* M-7002, which is obtained by using N-methyl-N'-nitro-N-nitrosoguanidine as a chemical mutagenic agent.

14. The process as set forth in claim 3, wherein said mutant is A.T.C.C. No. 20.315, *Candida lopolytica* M-7005, which is obtained by irradiation of ultraviolet light as a physical mutagenic means.

15. The process as set forth in claim 3, wherein said mutant is A.T.C.C. No. 20,316, *Candida guilliermondii* M-7006, which is obtained by using nitrous acid as a chemical mutagenic agent.

16. The process as set forth in claim 5, wherein said mutant is A.T.C.C. No. 20,317, *Candida periphelosum* M-7007, which is obtained by using N-methyl-N'-nitro-N-nitrosoguanidine as a chemical mutagenic agent.

17. The process as set forth in claim 5, wherein said mutant is A.T.C.C. No. 20.318, *Candida guilliermondii* M-7010, which is obtained by using acriflavin as a chemical mutagenic agent.

* * * * *